UNITED STATES PATENT OFFICE.

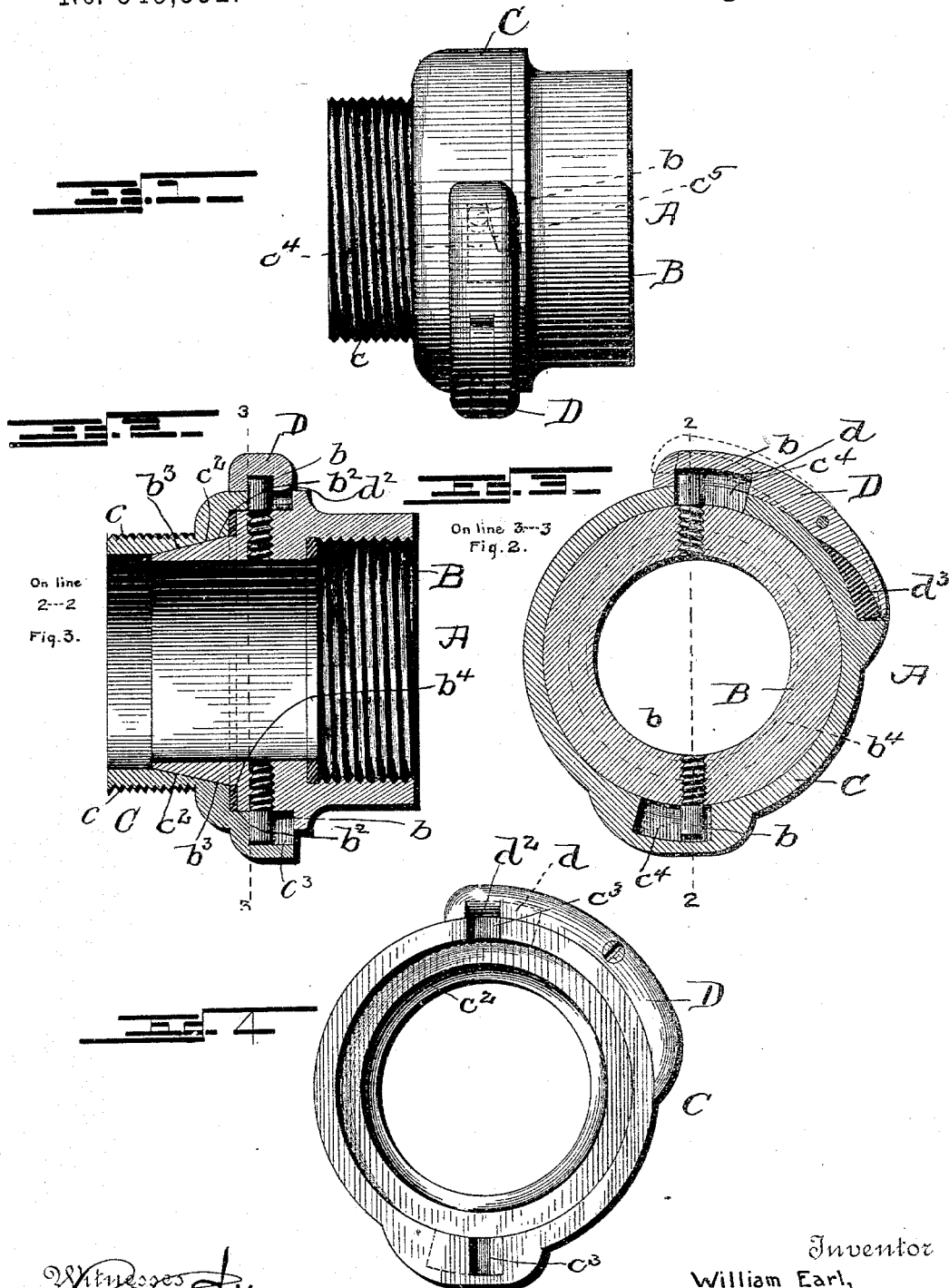

WILLIAM EARL, OF NORRISTOWN, PENNSYLVANIA.

HOSE-COUPLING.

SPECIFICATION forming part of Letters Patent No. 545,352, dated August 27, 1895.

Application filed February 7, 1895. Serial No. 537,592. (No model.)

*To all whom it may concern:*

Be it known that I, WILLIAM EARL, a citizen of the United States, residing at Norristown, in the county of Montgomery and State of Pennsylvania, have invented certain new and useful Improvements in Hose-Couplings, of which the following is a specification.

The invention relates to hose-couplings.

The object is to produce a coupling capable of being quickly and easily locked without the use of a separate tool or wrench and which will be securely held against accidental uncoupling, and, further, to employ a construction possessing advantages in point of simplicity, durability, and general efficiency.

To these ends my invention consists in the improved construction and combination of parts, to be hereinafter fully described and claimed.

In the accompanying drawings, forming part of this specification, similar letters of reference indicate corresponding parts in the several views.

Figure 1 is a top plan view of one embodiment of my invention. Fig. 2 is a longitudinal section of the same, taken on the line 2 2 of Fig. 3. Fig. 3 is a cross-section on the line 3 3 of Fig. 2, and Fig. 4 is a front elevation of one of the parts.

In the drawings, A designates the coupling, which comprises two main parts or members.

B designates the male member of the coupling, which consists in a tubular section internally threaded and having at diametrically-opposite points and integral therewith two pins or lugs $b$, extending radially outward beyond the periphery. This member terminates at its inner end $b^2$ in a tapered projection $b^3$, which is adapted to enter the flared mouth of the other member and thereby form a tight joint, as will be described. A gasket $b^4$ may be employed to insure proper connection with the threaded nipple of the hose-section.

C designates a second tubular section, which serves as the female member of the coupling and is threaded at one end upon its outer periphery, as at $c$. A portion of the inner periphery of this member is flared, as at $c^2$, to receive the tapered projection of the male member. At one end of the female member two openings $c^3$ are formed diametrically opposite each other and lead into angularly-disposed recesses $c^4$, (shown by dotted lines in Fig 1,) which latter are preferably contracted at their inner ends $c^5$ and adapted to receive the pins or lugs of the male member, thus forming a bayonet-joint, the tapering engaging surfaces serving to draw the two members more firmly together and form a perfectly-tight joint.

Pivotally secured between lugs upon the outer periphery of the female member is a gravity-catch D, having a notch $d$ coinciding with the angular recess in the female member. Upon one side of the catch, opposite the notch, a beveled indentation $d^2$ is formed, into which one of the lugs $b$ of the male member enters as the parts are coupled and forces the catch upward. Continued pressure, however, in effecting a proper engagement of the members carries this lug inward a distance sufficient to allow the pivoted catch to drop by the action of an elastic cushion $d^3$, its notch thereby engaging and locking the lug in the recess.

The operation of the device is as follows: When the two members of the coupling have been attached to the different sections of the hose and it is desired to couple the sections together, the male member is inserted into the female member, the pins passing into the recesses, pressing the pin-securer outwardly a sufficient distance to allow the catch to act, after which the male member is turned and thereby causes the lugs to enter and lock into the contracted portions of the recesses.

The advantages of the invention are obvious, inasmuch as it requires but a slight turn to securely lock the couplings together or to unlock them, the flared portions of the two members serving to form a water-tight passage way, thereby allowing no leakage.

Having thus described my invention, what I claim as new is—

The hose coupling comprising the male member having radial lugs or projections, the female member having bayonet slots to receive said lugs or projections, and the catch pivoted upon the female member and having a notch in its under side, at one end to receive one of said lugs or projections, said catch also having in one side, opposite its notch, a beveled indentation to provide, as the members are screwed together for the passage of one lug or projection engaging therewith into said notch, said catch having its opposite end resting upon an elastic cushion to permit the forcing down and locking of the engaging or notch-bearing end of the catch with the aforesaid lug of the male-member, substantially as set forth.

In testimony whereof I have hereunto affixed my signature in the presence of two subscribing witnesses.

WILLIAM EARL.

Witnesses:
ALAN W. CORSON,
ALEXANDER D. EARL.